(12) United States Patent
Lombardo et al.

(10) Patent No.: US 8,416,717 B2
(45) Date of Patent: Apr. 9, 2013

(54) SIGNALS COMMUNICATION APPARATUS

(75) Inventors: Giovanni Lombardo, Alcamo (IT); Salvatore Giombanco, Cassaro (IT); Salvatore Tumminaro, Marianopoli (IT); Filippo Marino, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 275 days.

(21) Appl. No.: 12/846,658

(22) Filed: Jul. 29, 2010

(65) Prior Publication Data

US 2011/0026544 A1  Feb. 3, 2011

(30) Foreign Application Priority Data

Jul. 30, 2009 (IT) .............................. MI2009A1366

(51) Int. Cl.
*H04B 1/44* (2006.01)
*H04W 4/00* (2009.01)
*H04J 3/16* (2006.01)
*H04B 1/38* (2006.01)

(52) U.S. Cl.
USPC ........... 370/278; 370/282; 370/329; 370/437; 375/220

(58) Field of Classification Search .......... 370/216–228, 370/241–252, 276–307, 328–350, 431–463; 375/219–222, 224–228, 232–233, 240.2, 375/357–358, 376; 714/703, 746–758, 774, 714/798–805
See application file for complete search history.

(56) References Cited

U.S. PATENT DOCUMENTS

| 5,925,144 | A  | * | 7/1999  | Sebaa ........................... 714/733  |
| 6,671,284 | B1 | * | 12/2003 | Yonge et al. ................... 370/462 |
| 7,035,285 | B2 | * | 4/2006  | Holloway et al. ............. 370/474 |
| 7,352,770 | B1 | * | 4/2008  | Yonge et al. ................... 370/445 |
| 7,694,204 | B2 | * | 4/2010  | Schmidt et al. ............... 714/758 |
| 7,698,618 | B2 | * | 4/2010  | Oliva et al. .................... 714/752 |

(Continued)

FOREIGN PATENT DOCUMENTS

GB  2 357 017  A  6/2001

OTHER PUBLICATIONS

Hamming, R. W. "Error Detecting and Error Correcting Codes." Bell System Technical Journal, 29 (1950): 147-160, 14 pages.

(Continued)

*Primary Examiner* — Tri H Phan
(74) *Attorney, Agent, or Firm* — Seed IP Law Group PLLC

(57) ABSTRACT

A signal communication apparatus comprising first and second channels for communicating signals between two electronic devices; each of said first and second channels has a transmitter for transmitting signals, a receiver for receiving signals and an interface arranged between the transmitter and the receiver. The transmitters code the signals in the form of a frame of H bits, with H being an integer, and adapted to serially transmit said frame of H bits through said interface, and the receivers decode the frames of H bits, a frame of H bits having P data bits, K redundancy bits and a sequence of L control bits adapted to identify the type of frame to be transmitted, with L, P and K being integers.

40 Claims, 2 Drawing Sheets

U.S. PATENT DOCUMENTS

| | | | |
|---|---|---|---|
| 7,937,644 B2 * | 5/2011 | Schmidt et al. | 714/758 |
| 8,010,735 B2 | 8/2011 | Rofougaran | |
| 8,099,648 B2 * | 1/2012 | Schmidt et al. | 714/758 |
| 2001/0024474 A1 | 9/2001 | Rakib et al. | |
| 2006/0172719 A1 | 8/2006 | Chen et al. | |
| 2008/0311862 A1 | 12/2008 | Spina et al. | |
| 2011/0209027 A1 * | 8/2011 | Schmidt et al. | 714/752 |

OTHER PUBLICATIONS

Darpa Internet Program: "Transmission Control Protocol," Internet Citation, Sep. 1981; Retrieved from the Internet: URL:http://www.scit.wlv.ac.uk/{c9451595/rfc/rfc7xx/RFC793.html> [retrieved May 6, 1999].

* cited by examiner

SIGNALS COMMUNICATION APPARATUS

BACKGROUND

1. Technical Field

The present disclosure relates to signal communication apparatus and methods.

2. Description of the Related Art

Applications for communicating circuits operating at high power voltages (even hundreds of volts) with circuits rather operating at low power voltages are known, in which there exists a galvanic isolation which increases the safety of the user who comes in contact with the low voltage interface.

Typically, the applications using such isolation are those related to the power suppliers which are to be directly connected to the mains, as well as the industrial applications in which driving loads at high voltages occurs.

A typical example are the "high side switch drivers", in which driving switches feed inductive loads by means of high voltages. In such a case, the potential differences that may dynamically develop between the low voltage part and the high voltage part may also reach thousands of volts per microsecond.

For transmitting signals, a typical solution is to use optocouplers which are however cumbersome and have performances degrading over time.

For such a reason, alternative solutions having more reliable performances over time are becoming popular and use integrated microantenna systems, i.e., integrated coupled inductors, as shown in US Patent Publication No. 2008/0311862. The coupled antennas are each integrated on one of the two devices and an insulating material is introduced therebetween. The insertion of a structure as described in the aforementioned patent publication highly affects the costs and the overall volume.

BRIEF SUMMARY

In an embodiment, a signal communication apparatus allows to simply transmit data through an integrated galvanically isolated channel interface in a reliable and simultaneously fast manner. In an embodiment, a communication protocol reduces data exchanges between devices coupled together with galvanically isolated interfaces, significantly reducing power consumption.

In an embodiment, a signal communication apparatus comprises first and second channels for communicating signals between two electronic devices, each of said first and second channels comprising a transmitter for transmitting signals, a receiver for receiving signals and an integrated galvanically isolated interface arranged between the transmitter and the receiver, said transmitter comprising first means adapted to code the signals in the form of a frame of H bits (F), with H being an integer, and adapted to serially transmit said frame of H bits through said interface, said receiver comprising a decoder for decoding said frame of H bits, said frame of H bits comprising P data bits, K redundancy bits and a sequence of L control bits adapted to identify the type of frame to be transmitted, with L, P and K being integers. In an embodiment, said signal to be transmitted is a data signal and said first means are adapted to change the P bits, the K bits and the sequence of L control bits of said frame to be transmitted. In an embodiment, said signal is an interrupt signal and said first means are adapted to change only the sequence of L control bits of said frame to be transmitted. In an embodiment, the receiver of the first channel is adapted to report the presence of errors when receiving the frame of H bits to the transmitter of the first channel by means of said second channel. In an embodiment, said receiver of the first channel sends a report of presence of errors when receiving the frame of H bits to the transmitter of the second channel, said transmitter of the second channel being adapted to send said report of presence of errors to the receiver of the second channel by means of another frame of H bits, said receiver of the second channel being able to transmit said report of the presence of errors to the transmitter of the first channel, said other frame of H bits having only the sequence of L control bits different from the sequence of L bits of the received frame. In an embodiment, the receiver of the first channel is adapted to request a resending of said frame of H bits received to the transmitter of the first channel by means of said second channel. In an embodiment, said receiver of the first channel sends a resend request of said previously received frame of H bits to the transmitter of the second channel, said transmitter of the second channel being adapted to send said request to the receiver of the second channel by means of a further frame of H bits, said receiver of the second channel being able to transmit said report of the presence of errors to the transmitter of the first channel, said further frame of H bits having only the sequence of L control bits different from the sequence of L bits of the received frame. In an embodiment, once said report of the presence of errors or said resend request of said frame of H bits has come, said transmitter of the first channel is adapted to resend said frame of H bits to the receiver of the first channel. In an embodiment, said receiver is configured to receive said digital signals within a given time window. In an embodiment, said interface is an interface with a maximum number of error for frame equal to or lower than the capacity of detecting and/or correcting of the algorithm used for coding the frame. In an embodiment, said interface is a galvanically isolated interface. In an embodiment, said receiver is adapted to send a signal of identifying transmission problems to an electronic device if the number of resend requests of said frame of H bits is equal to a threshold number.

In an embodiment, a method for communicating signals between two electronic devices comprises a step of reading data or interrupts or reports of errors to be transmitted, a step of coding said data or interrupts or reports of errors in the form of a frame of H bits, with H being an integer, said frame of H bits comprising P data bits, K redundancy bits and a sequence of L control bits adapted to identify the type of frame to be transmitted, with L, P and K being integers, a step of sending said frame, a step of decoding said received frame, and a step of controlling the received frame.

In an embodiment, a signal communication apparatus comprises: a first communication channel configured to communicate signals between first and second devices and including: a first-channel transmitter configured to encode and transmit signals; a first-channel receiver configured to receive and decode transmitted signals; and a first-channel integrated galvanic isolation interface coupled between the first-channel transmitter and the first-channel receiver, wherein the first-channel transmitter is configured to encode signals into frames of H bits including P data bits, K redundancy bits and L control bits to identify a frame type, P, K and L being positive integers, and to serially transmit encoded frames through the first-channel interface to the first-channel receiver and the first-channel receiver is configured to decode received encoded frames; and a second communication channel configured to communicate signals between the first and second devices and including: a second-channel transmitter configured to encode and transmit signals; a second-channel receiver configured to receive and decode transmitted signals; and a second-channel integrated galvanic isolation interface coupled between the second-channel transmitter and the second-channel receiver, wherein the second-channel transmitter is configured to encode signals into frames of H bits including P data bits, K redundancy bits and L control bits to identify the frame type, P, K and L being positive integers, and to serially transmit encoded frames through the second-channel interface to the second-channel receiver and the second-channel receiver is configured to decode received encoded frames, wherein the first-channel receiver is configured to selectively request a resending of a frame by the first-channel transmitter using the second communication channel. In an embodiment, a signal to be transmitted is a data signal and a respective channel transmitter is configured to change the P bits, the K bits and the L control bits of a frame to be transmitted. In an embodiment, a signal to be transmitted is an interrupt signal and a respective channel transmitter is configured to change only the L control bits of a frame to be transmitted. In an embodiment, the first-channel receiver is configured to communicate the request to resend the frame in response to an error when receiving a frame of H bits to the first-channel transmitter using the second communication channel. In an embodiment, the first-channel receiver sends an indication of the error when receiving the frame of H bits to the second-channel transmitter, said second-channel transmitter being configured to send said indication to the second-channel receiver in a second frame of H bits using the L control bits of the second frame, said second-channel receiver being configured to transmit said indication to the first-channel transmitter. In an embodiment, the first-channel transmitter is configured to respond to the indication of the error by resending the frame received with the error. In an embodiment, said first-channel receiver is configured to send a resend request to the second-channel transmitter, the second-channel transmitter is configured to send said request to the second-channel receiver using the L control bits of a further frame of H bits, said second-channel receiver configured to transmit said request to the first-channel transmitter of the first channel. In an embodiment, the first-channel transmitter is configured to respond to the request by resending the requested frame. In an embodiment, said receivers are configured to request retransmission based on a comparison of a number of bits received during a time window to one or more thresholds. In an embodiment, said interfaces have an expected maximum number of error for frame equal to or lower than a capacity of an error correction algorithm used to code the frames. In an embodiment, said first-channel receiver is configured to send a signal indicating transmission problems to the first electronic device based on a comparison of a number of resend requests to a threshold number.

In an embodiment, a method comprises: using a communication device to control communications between two electronic devices by: receiving at least one signal to be transmitted, the at least one signal comprising at least one of a signal of a data type, an interrupt type, and an error type; coding the at least one signal to be transmitted in a frame of H bits, with H being an integer, said frame of H bits comprising P data bits, K redundancy bits and a sequence of L control bits to identify at least one type of the at least one signal to be transmitted, with L, P and K being integers; sending said frame over a first galvanically isolated communication channel between the two electronic devices; decoding said frame; processing the received frame; and selectively requesting a retransmission of the frame over a second galvanically isolated communication channel between the two electronic devices. In an embodiment, a signal to be transmitted is a data signal and the coding comprises changing the P bits, the K bits and the L control bits of a frame to be transmitted. In an embodiment, a signal to be transmitted is an interrupt signal and the coding comprises changing only the L control bits of a frame to be transmitted. In an embodiment, the method comprises sending a control signal for the first communication channel using control bits of a frame sent through the second communication channel. In an embodiment, the control signal comprises a request for retransmission of another frame through the first communication channel. In an embodiment, the method comprises: checking frames transmitted through a first communication channel of the communication device for errors; and in response to detection of an error in a first frame, generating a control signal using a receiver of the first communication channel; forwarding the control signal from the receiver of the first communication channel to a transmitter of a second communication channel; coding control bits of a second frame based on the control signal; transmitting the coded second frame from the transmitter of the second communication channel to a receiver of the second communication channel; extracting the control signal from the transmitted second frame; and outputting the extracted control signal. In an embodiment, a transmitter of the first communication channel is configured to respond to the outputted extracted control signal by resending the first frame. In an embodiment, the selectively requesting comprises comparing a number of bits received in a time window to one or more thresholds and selectively requesting retransmission based on the comparison. In an embodiment, the method further comprises: comparing a number of resend requests associated with a communication channel of the communication device to a threshold number; sending an indication of a transmission problem to one of the electronic devices based on the comparison.

In an embodiment, a system comprises: a first electronic device; a second electronic device; a first communication channel coupled to the first and second electronic devices and including: a first-channel transmitter configured to encode signals into frames of H bits including P data bits, K redundancy bits and L control bits to identify a frame type, P, K and L being positive integers, and to serially transmit encoded frames; a first-channel receiver configured to receive and decode transmitted frames; and a first-channel galvanic isolation interface coupled between the first-channel transmitter and the first-channel receiver; and a second communication channel coupled to the first and second electronic devices and including: a second-channel transmitter configured to encode signals into frames of H bits including P data bits, K redundancy bits and L control bits to identify a frame type, P, K and L being positive integers, and to serially transmit encoded frames; a second-channel receiver configured to receive and decode transmitted frames; and a second-channel galvanic isolation interface coupled between the first-channel transmitter and the first-channel receiver, wherein the first-channel receiver is configured to selectively request a resending of a frame by the first-channel transmitter using the second communication channel. In an embodiment, a signal to be transmitted is a data signal and a respective channel transmitter is configured to change the P bits, the K bits and the L control bits of a frame to be transmitted. In an embodiment, a signal to be transmitted is an interrupt signal and a respective channel transmitter is configured to change only the L control bits of a frame to be transmitted. In an embodiment, the first-channel receiver is configured to send a request for retransmission in response to detection of an error in the frame.

In an embodiment, a computer-readable memory medium's contents cause a communication device to control communications between two electronic devices by performing a method, the method comprising: receiving at least one signal to be transmitted, the at least one signal comprising at least one of a signal of a data type, an interrupt type, and an error type; coding the at least one signal to be transmitted in a frame of H bits, with H being an integer, said frame of H bits comprising P data bits, K redundancy bits and a sequence of L control bits to identify at least one type of the at least one signal to be transmitted, with L, P and K being integers; sending said frame over a first galvanically isolated interface; decoding said frame; and selectively sending, based on the decoding and over a second galvanically isolated interface, a request to resend the frame. In an embodiment, a signal to be transmitted is a data signal and the coding comprises changing the P bits, the K bits and the L control bits of a frame to be transmitted. In an embodiment, a signal to be transmitted is an interrupt signal and the coding comprises changing only the L control bits of a frame to be transmitted. In an embodiment, the communication device comprises a first communication channel and a second communication channel and the method comprises sending a control signal for the first communication channel using control bits of a frame sent through the second communication channel. In an embodiment, the request to resend the frame is embedded in the control signal. In an embodiment, the method further comprises monitoring the first communication channel and the control signal comprises an indication to an electronic device of a transmission problem in the first communication channel.

In an embodiment, a communication device comprises: first means for encoding at least one signal to be transmitted into frames of H bits, with H being an integer, said frame of H bits comprising P data bits, K redundancy bits and a sequence of L control bits to identify at least one type of the at least one signal to be transmitted, with L, P and K being integers, the at least one signal comprising at least one of a signal of a data type and a control type; first means for serially transmitting encoded frames; first means for decoding encoded frames received from the first means for serially transmitting encoded frames; means for galvanically isolating the first means for transmitting from the first means for decoding; second means for encoding at least one signal to be transmitted into frames of H bits, with H being an integer, said frame of H bits comprising P data bits, K redundancy bits and a sequence of L control bits to identify at least one type of the at least one signal to be transmitted, with L, P and K being integers, the at least one signal comprising at least one of a signal of a data type and a control type; second means for serially transmitting encoded frames; second means for decoding encoded frames received from the second means for serially transmitting encoded frames; and means for galvanically isolating the second means for transmitting from the second means for decoding, wherein the first means for decoding is configured to selectively request retransmission of encoded frames by the first means for serially transmitting through the second means for serially transmitting and the second means for decoding. In an embodiment, the communication device further comprises: means for transmitting a control signal from the first means for receiving to the first means for serially transmitting through the second means for serially transmitting. In an embodiment, the communication device further comprises means for detecting transmission errors wherein the first means for decoding is configured to request retransmission in response to detection of a transmission error. In an embodiment, at least one signal to be transmitted by the second means for serially transmitting comprises a signal of a control type indicative of an interrupt. In an embodiment, the communication device further comprises means for limiting reception of transmitted frames to reception time windows.

BRIEF DESCRIPTION OF THE SEVERAL VIEWS OF THE DRAWINGS

Some features and advantages of embodiments of the present disclosure will be apparent from the following detailed description of practical embodiments thereof, shown by way of non-limiting example in the accompanying drawings, in which.

DETAILED DESCRIPTION

Figure 1:
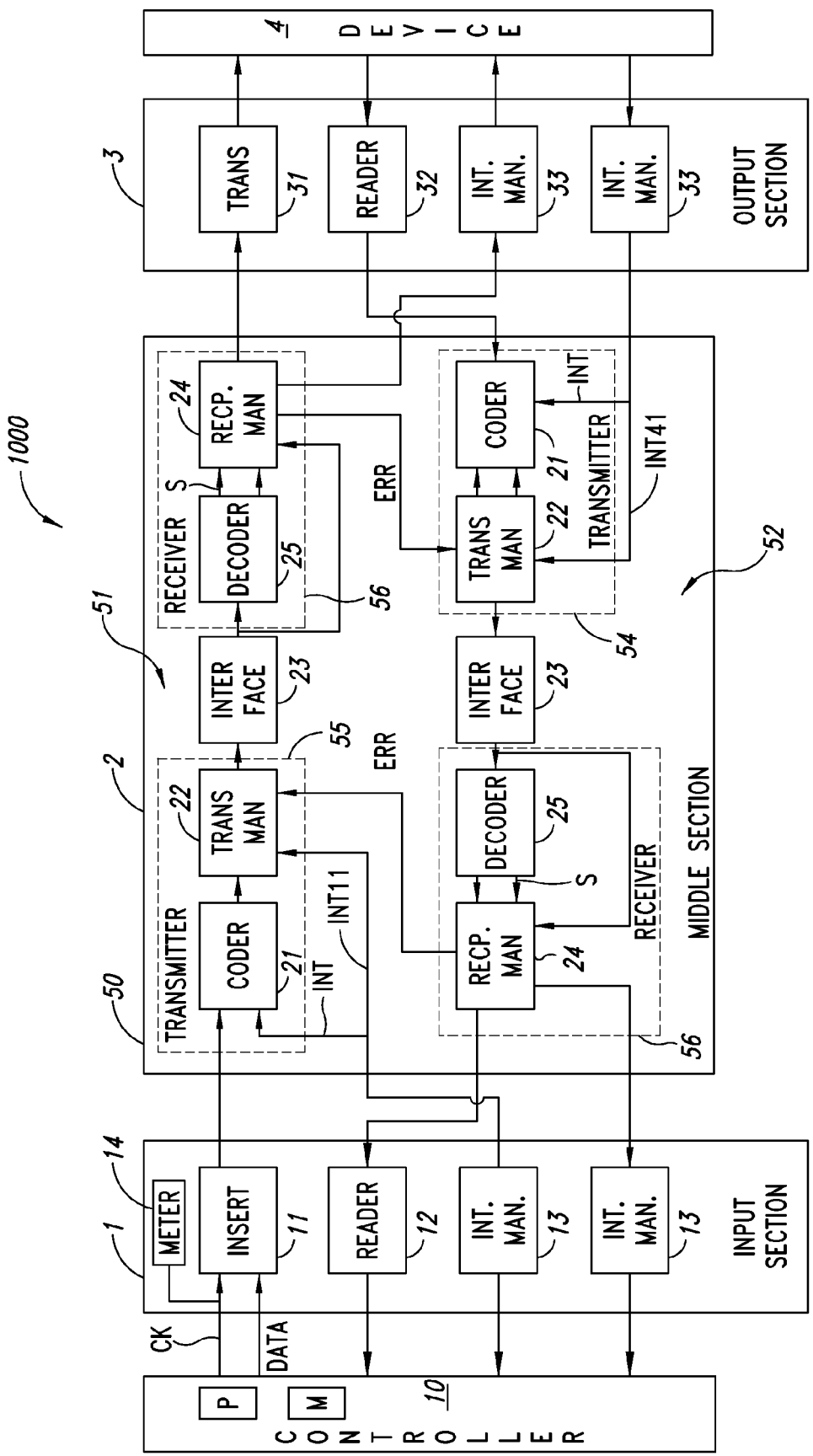
FIG. 1 is a diagram of an embodiment of a signal communication apparatus.

In the following description, numerous specific details are given to provide a thorough understanding of embodiments. The embodiments can be practiced without one or more of the specific details, or with other methods, components, materials, etc. In other instances, well-known structures, materials, or operations, such as, for example, decoders and encoders, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

By virtue of the high bit rates (tens of mbps) which may be reached on these channels, a possible solution uses one or at the most two isolated channels to communicate the microcontroller with the high-side driver, i.e., the input device and the power device. However, this solution uses an interface which interprets and acquires the signals from the microcontroller, serially transmits them through the galvanic isolation and makes them reach the device to be serially or parallel driven. Similarly, such an interface has to transmit the data from the device to be driven towards the microcontroller in an opposite direction. To this end, another isolated channel (i.e., the same channel in both directions) may be employed; in the first case, it is a full-duplex channel while in the second case it is a half-duplex.

The transmission through the antennas may be by means of radiofrequency signals or appropriately coded pulse signals. These transmission techniques are liable to errors due to electromagnetic interferences as well as to common mode transistors which commonly exist in these applications. Therefore, providing for the used interface to be able to detect and possibly correct the possible errors existing in the transmitted data is desirable. In the literature, there are many know techniques for detecting/correcting the errors (CRC, Hamming coding, Viterbi algorithm, etc.) and they generally involve adding redundancy bits to the transmitted data to allow the receiver to control the correctness thereof. Furthermore, situations may occur in which the channel is disturbed for quite a long time; in such a case, it is appropriate for the receiver to report the enduring error situation to the microcontroller or device to be driven so that they act in the most appropriate manner (e.g., by suspending the data transmission for a short period of time). Another peculiar aspect of these applications is transferring data as well as possible warning or control signals which indicate specific actions to be undertaken to both involved parties.

A specific case is the one in which the load of the power device is short-circuited. In such a case, these devices may be provided with a control logic which detects the problem and automatically turns off the involved output. However, the microcontroller is informed about what has occurred so as to be able to appropriately manage the application, possibly requesting information about the involved output. These reports, named interrupts, are transmitted through the channel at hand which therefore is able to optimally transmit not only the application data but also these interrupts by means of the interface. For such a reason, the data to be transmitted are appropriately grouped and ranked so as to best exploit the channel at hand. The so grouped data are typically named frame.

FIG. 1 shows a diagram of a system having a signal communication apparatus 1000 in accordance with an embodiment. The apparatus 1000 comprises an input section 1, a middle section 2 and an output section 3 for driving a device 4 of the system.

The input section 1 comprises a circuit block 11 for inserting data to be transferred to the device 4, a circuit block 12 for reading data from the device 4 and circuit blocks 13 for managing interrupt signals to be sent to the device 4 or coming therefrom. The input data to the block 11 are provided by a controller 10 or other device, such as a microcontroller or a device having one or more processors P coupled to one or more memories M.

In an embodiment, the blocks 13 configured to manage the interrupts may be storage elements which track the report received in either direction.

In an embodiment, the block 11 configured to insert the data comprises a register which serially or parallelly receives the data and makes the data available to a coder in a parallel form.

In an embodiment, the block 12 configured to read the data from the device 4 comprises a register which is parallelly loaded by the decoder and which serially or parallelly provides the data.

In the serial operation of an embodiment, the clock signal CK for synchronizing the data is provided by the microcontroller 10 both for the block 11 and the block 12.

In an embodiment, an interrupt signal may be intended to report the completion of the reading/writing operation and to start the transmission through the isolation.

The input section may also comprise a meter 14 configured to count the number of received hits of clock CK and to start the transmission when the expected number has been reached.

In the parallel operation of an embodiment, the presence of an interrupt signal which reports to the circuit 11 the presence of new data to be transmitted may be included.

The output section 3 comprises a block 31 configured to transmit the data from the microcontroller to the device to be driven, a circuit block 32 configured to read the data from the device to be driven, and circuit blocks 33 configured to manage the interrupts.

As with the input section 1, the blocks 33 for managing the interrupts may be simple storage elements.

The block 31 for transmitting data to the device 4 to be driven receives the input data in the parallel form and may serially or parallelly operate in output. In the first case, there is a clock signal capable of synchronizing the reading/writing operation, in the second case the clock is optional, a warning signal (interrupt) for enabling the reading/writing may be present.

In an embodiment, an interrupt INT41 from the device to be driven starts the reading/writing of the data and then the transmission of the data towards the microcontroller 10.

In another embodiment, the interrupt INT41 starts the transmission of the data towards the microcontroller 10 without first carrying out the reading/writing.

The block 32 for reading the data from the device to be driven comprises a register which may be synchronously loaded through the clock of circuit 31, i.e., parallelly through a reporting interrupt or, again, a circuit configured to compare the input data with those within the register may be present to start the transmission in case of variations, as described for the input section 1.

The functions of an embodiment of the output section 3 are: reporting an interrupt to the device to be driven 4, reading/writing the data from and to the device 4 to be driven with a subsequent transmission towards the microcontroller 10, and receiving an interrupt by the device 4 to be driven which is possibly followed by the reading/writing of the data and therefore the transmission towards the microcontroller 10.

The middle section 2 comprises a full-duplex channel 50, comprising a first channel 51 and a second channel 52, for transmitting data to the device 4 and receiving data from the device 4. In order to appropriately transmit the data or interrupts even in the presence of noises on channel 50, there is provided a step of correcting/detecting errors, with a subsequent request of retransmission and the possibility of reporting the same error in case of enduring detection of errors.

Furthermore, the possibility of transmitting asynchronous signals, e.g., interrupts, from the device to be controlled towards the input section 1 for service reports (e.g., a malfunction) is provided.

To manage these functionalities, a frame F is used which has K coding or redundancy bits and L control bits, with P, K and L being integers and other than zero, as well as containing P data bits to be transmitted to the device to be driven. In order to detect the errors, any known coding may be used, which is able to correct and/or detect a number of errors by adding a K number of redundancy bits to the frame to be transmitted, where K is a function of the N bits to be transmitted; the N bits comprise P bits and also L control bits. For example, Hamming coding may be used, which with N input bits introduces K control bits such that the inequality $N+1 \leq 2^K - K$ is satisfied; this coding is described in HAMMING, R. W. "Error Detecting and Error Correcting Codes." *Bell System Tech. Jour.*, 29 (1950): 147-160. This coding is able to correct the single error and, by adding a further parity bit, detect the double error. When receiving, the decoder recalculates the control bits related to the received data and compares them with those existing in the received frame.

The configuration of the L control bits determines the type of frame F to be sent. For example, if the number of bits is 3 and if there is a unique interrupt to be transmitted to the microcontroller 10 by the device 4 or vice versa, a configuration is allowed as in the following table where the configurations of the control bits L and the type of frame are shown:

| 0 | 0 | 0 | Data |
|---|---|---|---|
| 0 | 0 | 1 | Data + Resend Request |
| 0 | 1 | 0 | Resend Request |
| 0 | 1 | 1 | Don't Care |
| 1 | 0 | 0 | Interrupt (Falling Edge) |

| | | | |
|---|---|---|---|
| 1 | 0 | 1 | Interrupt (Rising Edge) |
| 1 | 1 | 0 | Resend Request + Interrupt (Falling Edge) |
| 1 | 1 | 1 | Resend Request + Interrupt (Rising Edge) |

Therefore, a string or sequence of L bits of the "000" type corresponds to the Data frame F, i.e., the frame reporting the presence of new data; with the string 010, we have the Resend Request frame indicating to the receiver the need for retransmitting the data frame because of the presence of an error, the strings 100 or 101 indicate a specific condition or interrupt, e.g., the malfunctioning of the device 4 or 10, the strings 110 and 111 indicate a specific condition or interrupt, e.g., the malfunctioning of the device 4 or 10 and the need for retransmitting the data frame. In the case of transmission of interrupt signals, P data bits and K redundancy bits will remain the same and only the L control bits will be changed. Therefore, only when sending new data, the P bits and the K bits of the frame will be changed, while the P bits and the K bits of the frame will not change in case of transmission of interrupt signals or resend request of the data frame.

As illustrated, the channels 51, 52 belonging to the full-duplex channel 50 of the middle section 2 each comprise:
a coder 21 receiving data to be transmitted in the parallel form from the block 11 or 31 and/or the interrupts from the block 13 or 33, and returning a frame F as an output with the aforementioned N bits, the L control bits and the K coding bits;
the transmission managing circuit 22 receives the coded frame F as an input and serially forwards the transmission through the channel by managing the timing thereof depending on the bits transmission mode, i.e., with pulse signals or a radiofrequency modulated carrier;
an interface 23 (liable to errors both on the clock and on the data) on which the frame F is transmitted and, preferably, also a clock signal CK while sending the data for synchronizing the receiver and the transmitter;
a decoder 25 receiving the coded frame F as an input and providing the N bits as an input to the block 12 or 31 by means of the circuit 24 and a signal S to the circuit 24 indicating the presence of errors on the received frame F;
a reception managing circuit 24 managing the timing of the reception preferably based on a starting signal START generated by the circuit 22 and providing a signal RE as an output indicating the successful data reception. As illustrated, each channel has a transmitter 54 comprises a coder 21 and a transmission manager 22 and a receiver 56 comprising decoder 25 and a reception manager 24.

The transmission interface 23 of an embodiment is the type with a maximum number of error for frame equal to or lower than the capacity of detecting and/or correcting the coding algorithm of frame F. The interface 23 of an embodiment is a galvanically isolated interface such as the one of the type described in US Patent Publication No. 2008/0311862.

The input section 1 of an embodiment acquires the data from the microcontroller 10 which reports the completion of the operation to the transmission managing circuit 22 by means of an interrupt INT11 (not indicated in the figure).

Microcontroller 10 may use other interrupts INT for reporting specific events to the device 4 to be driven such as, for example, asynchronously turning off all outputs of the device. The number of interrupts to be managed affects the number of control bits existing in the frame used by the protocol.

The output data from the block 11 of the input section 1 or from block 32 of the output section 3 may be instantaneously coded by the coder 21. This operation does not affect the timing of the transmission, and therefore does not affect the performance of the interface as it implements an algorithm (e.g., the Hamming coding) which does not process the data in subsequent steps but operates on the inputs in parallel.

Events which may start the sending of a new frame F by the transmission managing circuit 22 comprise:
external interrupt INT involving the transmission of the input data;
request for retransmission of the last sent frame F;
detection of errors ERR in the last received frame F, and therefore communicating to the transmitter that a retransmission of the last sent frame is desired.

In an embodiment, the transmission of the data through the channels 51, 52 comprises the following steps:
identifying the type of frame F to be transmitted (DATA, INTERRUPT, REQUEST RESEND);
loading the data to the block 11 or 32;
synchronizing with the receiver by means of sending a clock signal CK;
emptying the block 11 or 32.

The synchronization may be done by sending a clock signal from the transmitter to the receiver in order to synchronize the circuit 24 with the circuit 22. A step of calibrating the receiver, which may be implemented by sending a high clock and low data, may also be included; at the end of this step, the transmission of data and clock starts and consequently the loading of the data to the receiving buffer.

The data reception is limited to a time window T ensuring a cut-off limit to the duration of the receiving step; this cut-off limit depends on the data transmission frequency through the channel, on the number of bits of the frame to be transmitted and on possible synchronizing steps.

Assuming that the synchronizing step lasts for 3 microseconds and the transmission of the data lasts for 4 microseconds, by taking into account possible uncertainties, a good choice for time T is 10 microseconds. At the end of the time window T, the data are made available to the decoder and the presence of new data is notified to the reception managing circuit.

When the reception of the frame F ends, according to the above-described modes, the decoded data are processed for the reception managing circuit 24 to be able to implement the relevant actions to be undertaken.

In particular, the following cases may occur:
the data frame F has no errors and the block 31 or 11 is reported that the data may be loaded; furthermore, if the control bits report the presence of interrupts INT they are reported to the input/output section;
the frame has errors, therefore a frame retransmission request is communicated to the transmission managing circuit 22;
the frame F is correct and the L control bits indicate that the last frame has to be retransmitted.

The coder implements any coding technique which receives in parallel a data block of N bits and returns a block of N+K bits as an output.

The L bits are frame identifying bits, i.e., those allowing to identify the function of the frame to be sent. The additional K bits are redundancy bits allowing the receiver to check the correctness of the received frame. When receiving, the decoder 25 generates again the coding bits according to the received data and determines the possible presence of errors by means of a comparison with the received coding bits. In case of error, a signal S is generated which indicates the presence thereof to the receiver managing circuit 24. The transmission managing circuit 22 receives the coded frame F to be transmitted, the asynchronous signals generated by the microcontroller and possible error reports generated by the reception managing circuit as an input; a vector of L bits is generated according to the interrupts INT and the error report. These bits will be interpreted by the receiving circuit of the other device for deciding the actions to be undertaken.

The transmission of the report of the presence of errors ERR when receiving the frame F, or simply report of errors ERR, and the report of data resend request is made through channel 52 if channel 51 is employed for transmitting the frame F. The reception managing circuit 24 of channel 51 sends the report of either the presence of errors ERR or data resend request to the transmission managing circuit 22 of channel 52; a frame of error reporting or data resending is received through the channel 52, and the reception managing circuit 24 of channel 52 sends said report ERR or said data resend request to the transmission managing circuit 22 of channel 51. If channel 52 is employed for transmitting the frame F, the transmission of the report of either the presence of errors ERR when receiving the frame F or the data resend request is made through the channel 51.

Figure 2:
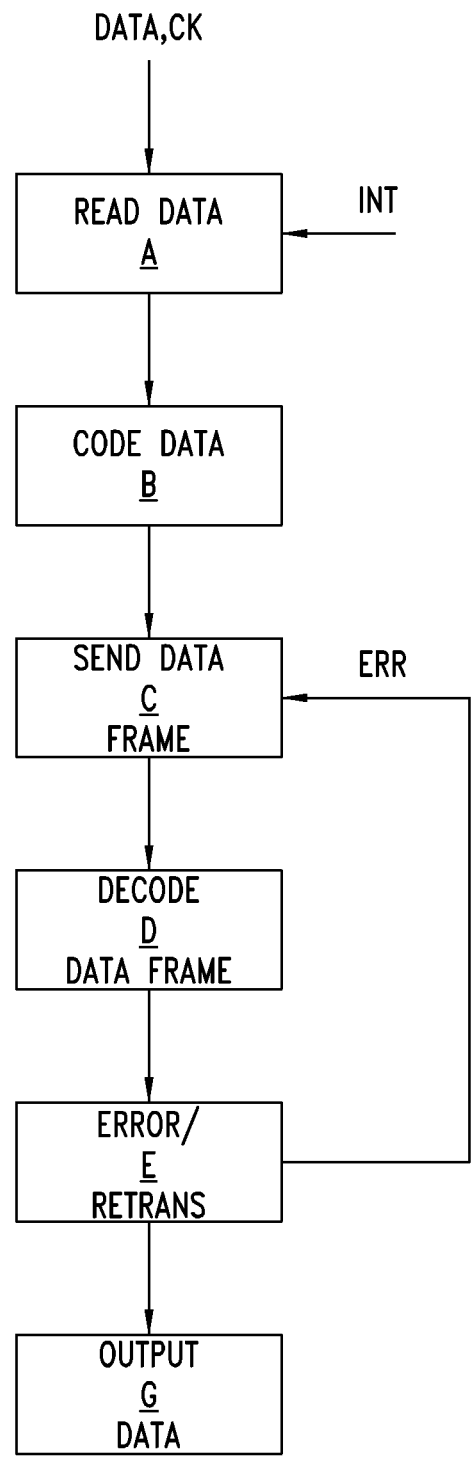
FIG. 2 is a flowchart of an embodiment of a method for operating the apparatus in FIG. 1.

FIG. 2 shows a flowchart of an embodiment of a method for operating an apparatus, for example, the apparatus of FIG. 1. If a signal indicating the presence of new data DATA or interrupts INT to be transmitted comes from the input section 1, we have a step A of reading data, a step B of coding data with the generation of a frame F with N+K bits, in which the L bits are generated according to the input interrupt signal INT or DATA, a step C of sending data; the step C of sending data is also possible in case of report of an error ERR by the receiver. The L bits identifying the frame F which will be for appropriately processing the received data are generated according to the signal DATA, the interrupts and the signal ERR. The coded data are therefore loaded and the synchronizing step is started. Such a step is optional and is for reporting the arrival of new data to the receiver and, possibly, to make it exit from a standby state in which it is put in the absence of data on the channel.

The method comprises a step D of receiving the signal and decoding the received frame F. A step E follows, in which there is a control of the received frame F in order to control:

if the decoded frame has any errors; in such a case, the transmitter of the other channel is reported that the retransmission of the last sent frame is to be requested;

if a retransmission is requested; in such a case, the transmitter is indicated to resend the last transmitted frame. If there was no error when transmitting frame F, we have a step G in which the decoded data are sent to the output section 3.

Furthermore, this apparatus takes into account the number of retransmissions made for possibly reporting an enduring error situation on the channel to the microcontroller 10 or device 4 to be driven; said enduring error situation is detected by the reception managing circuit 24.

The transmission channels 51, 52 may comprise two coupled turns separated by at least one insulating material, as shown in US Patent Publication No. 2008/311862, and by circuits capable of transmitting a digital signal, possibly with the clock by means of an appropriate coding. A transmission technique by means of a modulated radiofrequency carrier or pulses may be selected.

In an embodiment, the circuit managing the reception of the data from the channel receives an enabling signal EN_RX as an input, which indicates the presence of data on the channel, the data themselves and the clock signal CK allowing to store the data in a buffer. The correctness of the frame is checked by counting the number of received bits and through the specific decoder output which reports the possible presence of errors on the data.

When the receiving circuit is enabled, a time window T is started within which the arrival of the data is expected. It allows to avoid that a possible noise on the channel may enable the receiving circuit for an indefinite time, thus remaining waiting for a clock signal. If the frame F is correct, the decoded data are provided to the output section for being transmitted to the device to be driven along with a signal indicating the presence of new data.

On the other hand, if errors are present, a warning signal is sent to the transmission managing circuit 22 of channel 52 or 51 for transmitting a frame which indicates the need for retransmitting the last sent frame F. Therefore, the data communication between the microcontroller 10 and the device 4 is carried out through the channel 51, while the report of errors ERR or the resend request of the last frame F is carried out through the channel 52; vice versa, the data communication between the device 4 and the microcontroller 10 is carried out through the channel 52 while the report of errors ERR is carried out by sending a frame on the channel 51.

Furthermore, this apparatus takes into account the retransmissions requested for reporting a possible problem to the microcontroller or device to be driven. When the number of transmission requests of the data frame F reaches a predetermined number Q, the receiver sends a signal identifying transmission problems to the microcontroller 10 or device 4, i.e., the electronic device which receives the data from the receiver.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums. The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A signal communication apparatus, comprising:
a first communication channel configured to communicate signals between first and second devices and including:
   a first-channel transmitter configured to encode and transmit signals;
   a first-channel receiver configured to receive and decode transmitted signals; and
   a first-channel integrated galvanic isolation interface coupled between the first-channel transmitter and the first-channel receiver, wherein the first-channel transmitter is configured to encode signals into frames of H bits including P data bits, K redundancy bits and L control bits to identify a frame type, P, K and L being positive integers, and to serially transmit encoded frames through the first-channel interface to the first-channel receiver and the first-channel receiver is configured to decode received encoded frames; and
a second communication channel configured to communicate signals between the first and second devices and including:
   a second-channel transmitter configured to encode and transmit signals;
   a second-channel receiver configured to receive and decode transmitted signals; and
   a second-channel integrated galvanic isolation interface coupled between the second-channel transmitter and the second-channel receiver, wherein the second-channel transmitter is configured to encode signals into frames of H bits including P data bits, K redundancy bits and L control bits to identify the frame type, P, K and L being positive integers, and to serially transmit encoded frames through the second-channel interface to the second-channel receiver and the second-channel receiver is configured to decode received encoded frames, wherein the first-channel receiver is configured to selectively request a resending of a frame by the first-channel transmitter using the second communication channel.

2. The apparatus of claim 1 wherein a signal to be transmitted is a data signal and a respective channel transmitter is configured to change the P bits, the K bits and the L control bits of a frame to be transmitted.

3. The apparatus of claim 1 wherein a signal to be transmitted is an interrupt signal and a respective channel transmitter is configured to change only the L control bits of a frame to be transmitted.

4. The apparatus of claim 1 wherein the first-channel receiver is configured to communicate the request to resend the frame in response to an error when receiving a frame of H bits to the first-channel transmitter using the second communication channel.

5. The apparatus of claim 4 wherein the first-channel receiver sends an indication of the error when receiving the frame of H bits to the second-channel transmitter, said second-channel transmitter being configured to send said indication to the second-channel receiver in a second frame of H bits using the L control bits of the second frame, said second-channel receiver being configured to transmit said indication to the first-channel transmitter.

6. The apparatus of claim 5 wherein the first-channel transmitter is configured to respond to the indication of the error by resending the frame received with the error.

7. The apparatus of claim 1 wherein said first-channel receiver is configured to send a resend request to the second-channel transmitter, the second-channel transmitter is configured to send said request to the second-channel receiver using the L control bits of a further frame of H bits, said second-channel receiver configured to transmit said request to the first-channel transmitter of the first channel.

8. The apparatus of claim 1 wherein the first-channel transmitter is configured to respond to the request by resending the requested frame.

9. The apparatus of claim 1 wherein said receivers are configured to request retransmission based on a comparison of a number of bits received during a time window to one or more thresholds.

10. The apparatus of claim 1 wherein said interfaces have a maximum number of error for frame equal to or lower than a capacity of an error correction algorithm used to code the frames.

11. The apparatus of claim 1 wherein said first-channel receiver is configured to send a signal indicating transmission problems to the first electronic device based on a comparison of a number of resend requests to a threshold number.

12. A method, comprising:
using a communication device to control communications between two electronic devices by:
   receiving at least one signal to be transmitted, the at least one signal comprising at least one of a signal of a data type, an interrupt type, and an error type;
   coding the at least one signal to be transmitted in a frame of H bits, with H being an integer, said frame of H bits comprising P data bits, K redundancy bits and a sequence of L control bits to identify at least one type of the at least one signal to be transmitted, with L, P and K being integers;
   sending said frame over a first galvanically isolated communication channel between the two electronic devices;
   decoding said frame;
   processing the received frame; and
   selectively requesting a retransmission of the frame over a second galvanically isolated communication channel between the two electronic devices.

13. The method of claim 12 wherein a signal to be transmitted is a data signal and the coding comprises changing the P bits, the K bits and the L control bits of a frame to be transmitted.

14. The method of claim 12 wherein a signal to be transmitted is an interrupt signal and the coding comprises changing only the L control bits of a frame to be transmitted.

15. The method of claim 12 wherein the method comprises sending a control signal for the first communication channel using control bits of a frame sent through the second communication channel.

16. The method of claim 15 wherein the control signal comprises a request for retransmission of another frame through the first communication channel.

17. The method of claim 12, comprising:
checking frames transmitted through a first communication channel of the communication device for errors; and
in response to detection of an error in a first frame,
   generating a control signal using a receiver of the first communication channel;

forwarding the control signal from the receiver of the first communication channel to a transmitter of a second communication channel;
coding control bits of a second frame based on the control signal;
transmitting the coded second frame from the transmitter of the second communication channel to a receiver of the second communication channel;
extracting the control signal from the transmitted second frame; and
outputting the extracted control signal.

18. The method of claim 17 wherein a transmitter of the first communication channel is configured to respond to the outputted extracted control signal by resending the first frame.

19. The method of claim 12 wherein the selectively requesting comprises comparing a number of bits received in a time window to one or more thresholds and selectively requesting retransmission based on the comparison.

20. The method of claim 12, further comprising:
comparing a number of resend requests associated with a communication channel of the communication device to a threshold number;
sending an indication of a transmission problem to one of the electronic devices based on the comparison.

21. The method of claim 12 wherein the selectively requesting the retransmission comprises a receiver of the first galvanically isolated communication channel selectively requesting a resending of the frame by a transmitter of the first galvanically isolated communication channel using the second galvanically isolated communication channel.

22. A system, comprising:
a first electronic device;
a second electronic device;
a first communication channel coupled to the first and second electronic devices and including:
a first-channel transmitter configured to encode signals into frames of H bits including P data bits, K redundancy bits and L control bits to identify a frame type, P, K and L being positive integers, and to serially transmit encoded frames;
a first-channel receiver configured to receive and decode transmitted frames; and
a first-channel galvanic isolation interface coupled between the first-channel transmitter and the first-channel receiver; and
a second communication channel coupled to the first and second electronic devices and including:
a second-channel transmitter configured to encode signals into frames of H bits including P data bits, K redundancy bits and L control bits to identify a frame type, P, K and L being positive integers, and to serially transmit encoded frames;
a second-channel receiver configured to receive and decode transmitted frames; and
a second-channel galvanic isolation interface coupled between the first-channel transmitter and the first-channel receiver, wherein the first-channel receiver is configured to selectively request a resending of a frame by the first-channel transmitter using the second communication channel.

23. The system of claim 22 wherein a signal to be transmitted is a data signal and a respective channel transmitter is configured to change the P bits, the K bits and the L control bits of a frame to be transmitted.

24. The system of claim 22 wherein a signal to be transmitted is an interrupt signal and a respective channel transmitter is configured to change only the L control bits of a frame to be transmitted.

25. The system of claim 22 wherein the first-channel receiver is configured to send a request for retransmission in response to detection of an error in the frame.

26. A non-transitory computer-readable memory medium whose contents cause a communication device to control communications between two electronic devices by performing a method, the method comprising:
receiving at least one signal to be transmitted, the at least one signal comprising at least one of a signal of a data type, an interrupt type, and an error type;
coding the at least one signal to be transmitted in a frame of H bits, with H being an integer, said frame of H bits comprising P data bits, K redundancy bits and a sequence of L control bits to identify at least one type of the at least one signal to be transmitted, with L, P and K being integers;
sending said frame over a first galvanically isolated interface;
decoding said frame; and
selectively sending, based on the decoding and over a second galvanically isolated interface, a request to resend the frame.

27. The non-transitory computer-readable memory medium of claim 26 wherein a signal to be transmitted is a data signal and the coding comprises changing the P bits, the K bits and the L control bits of a frame to be transmitted.

28. The non-transitory computer-readable memory medium of claim 26 wherein a signal to be transmitted is an interrupt signal and the coding comprises changing only the L control bits of a frame to be transmitted.

29. The non-transitory computer-readable memory medium of claim 26 wherein the communication device comprises a first communication channel and a second communication channel and the method comprises sending a control signal for the first communication channel using control bits of a frame sent through the second communication channel.

30. The non-transitory computer-readable memory medium of claim 29 wherein the request to resend the frame is embedded in the control signal.

31. The non-transitory computer-readable memory medium of claim 29 wherein the method further comprises monitoring the first communication channel and the control signal comprises an indication to an electronic device of a transmission problem in the first communication channel.

32. The non-transitory computer-readable medium of claim 26 wherein the selectively sending the request to resend the frame comprises a receiver coupled to the first galvanically isolated interface selectively sending the request to a transmitter coupled to the first galvanically isolated interface through the second galvanically isolated interface.

33. The non-transitory computer-readable medium of claim 26, wherein the method comprises:
checking frames transmitted through the first galvanically isolated interface for errors; and
in response to detection of an error in a first frame,
generating a control signal using a receiver associated with the first galvanically isolated interface;
forwarding the control signal from the receiver to a transmitter associated with the second galvancially isolated interface;
coding control bits of a second frame based on the control signal;

transmitting the coded second frame from the transmitter to a receiver associated with the second galvanically isolated interface;

extracting the control signal from the transmitted second frame; and outputting the extracted control signal.

34. The non-transitory computer-readable medium of claim 26 wherein the selectively sending comprises comparing a number of bits received in a time window to one or more thresholds and selectively sending the request to resend the frame based on the comparison.

35. The non-transitory computer-readable medium of claim 26 wherein the method comprises:

comparing a number of resend requests associated with a communication channel of the communication device to a threshold number;

sending an indication of a transmission problem to one of the electronic devices based on the comparison.

36. A communication device, comprising:

first means for encoding at least one signal to be transmitted into frames of H bits, with H being an integer, said frame of H bits comprising P data bits, K redundancy bits and a sequence of L control bits to identify at least one type of the at least one signal to be transmitted, with L, P and K being integers, the at least one signal comprising at least one of a signal of a data type and a control type;

first means for serially transmitting encoded frames;

first means for decoding encoded frames received from the first means for serially transmitting encoded frames;

means for galvanically isolating the first means for transmitting from the first means for decoding;

second means for encoding at least one signal to be transmitted into frames of H bits, with H being an integer, said frame of H bits comprising P data bits, K redundancy bits and a sequence of L control bits to identify at least one type of the at least one signal to be transmitted, with L, P and K being integers, the at least one signal comprising at least one of a signal of a data type and a control type;

second means for serially transmitting encoded frames;

second means for decoding encoded frames received from the second means for serially transmitting encoded frames; and means for galvanically isolating the second means for transmitting from the second means for decoding, wherein the first means for decoding is configured to selectively request retransmission of encoded frames by the first means for serially transmitting through the second means for serially transmitting and the second means for decoding.

37. The communication device of claim 36, further comprising:

means for transmitting a control signal from the first means for receiving to the first means for serially transmitting through the second means for serially transmitting.

38. The communication device of claim 36, further comprising means for detecting transmission errors wherein the first means for decoding is configured to request retransmission in response to detection of a transmission error.

39. The communication device of claim 36 wherein the at least one signal to be transmitted by the second means for serially transmitting comprises a signal of a control type indicative of an interrupt.

40. The communication device of claim 36, further comprising means for limiting reception of transmitted frames to reception time windows.

* * * * *